(12) United States Patent
Nurminen et al.

(10) Patent No.: US 11,519,750 B2
(45) Date of Patent: Dec. 6, 2022

(54) ESTIMATING A DEVICE LOCATION BASED ON DIRECTION SIGNS AND CAMERA OUTPUT

(71) Applicant: HERE Global B.V., Eindhoven (NL)

(72) Inventors: Henri Nurminen, Tampere (FI); Pavel Ivanov, Tampere (FI); Lauri Wirola, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 138 days.

(21) Appl. No.: 17/100,333

(22) Filed: Nov. 20, 2020

(65) Prior Publication Data

US 2022/0163343 A1 May 26, 2022

(51) Int. Cl.
*G01C 21/36* (2006.01)
*G06V 20/58* (2022.01)

(52) U.S. Cl.
CPC ..... *G01C 21/3682* (2013.01); *G01C 21/3602* (2013.01); *G01C 21/3647* (2013.01); *G06V 20/582* (2022.01)

(58) Field of Classification Search
CPC ............ G01C 21/3602; G01C 21/3644; G01C 21/3647; G06V 20/582
See application file for complete search history.

(56) References Cited

U.S. PATENT DOCUMENTS

| | | | | |
|---|---|---|---|---|
| 9,651,393 | B2 * | 5/2017 | Takahashi | B60W 50/14 |
| 10,061,994 | B2 * | 8/2018 | Tsushima | G06V 30/40 |
| 2010/0103040 | A1 * | 4/2010 | Broadbent | G01S 19/48 |
| | | | | 342/357.28 |
| 2011/0112756 | A1 * | 5/2011 | Winkler | G01C 21/3658 |
| | | | | 701/533 |
| 2014/0297168 | A1 | 10/2014 | Ovens et al. | |
| 2017/0350712 | A1 * | 12/2017 | Tateishi | G01S 13/931 |

FOREIGN PATENT DOCUMENTS

WO 2014172792 A1 10/2014

OTHER PUBLICATIONS

Tabot et al.: Robot Navigation in Unseen Spaces Using an Abstract Map; 115 May 2020; 16pgs.
Yeh et al: An Intelligent Indoor Positioning System Based on Pedestrian Directional Signage Object Detection: A Case Study of Taipei Main Station' Oct. 8, 2019; 20pgs.

\* cited by examiner

*Primary Examiner* — Vivek D Koppikar
*Assistant Examiner* — Andrew James Trettel
(74) *Attorney, Agent, or Firm* — Jeffrey R. Moisan; HERE Global B.V.

(57) ABSTRACT

Systems and methods for determining a location based on a direction sign. A method includes receiving a map of a physical area that includes a plurality of nodes connected by a links, where each link represents a travel path between connected nodes and has an associated distance value. The method includes receiving image data that indicates at least a first destination point of interest (POI) associated with a first physical direction and a second destination POI associated with a second physical direction. The method includes associating the first destination POI with a first node and associating the second destination POI with a second node. The method includes determining a location node of the plurality of nodes according to the distances and directions of shortest paths to the first and second nodes, and returning a physical location corresponding to the determined location node.

19 Claims, 5 Drawing Sheets

ESTIMATING A DEVICE LOCATION BASED ON DIRECTION SIGNS AND CAMERA OUTPUT

TECHNICAL FIELD

Example embodiments of the present invention relate generally to systems and methods for identifying the location of a device, and more particularly, to identifying the location of the device using image data corresponding to an image of a direction sign.

BACKGROUND

Automatic identification of the location of a user device is helpful in a number of ways. From a user's perspective, for example a user of a mobile telephone or other device, it is helpful if the device can automatically identify its absolute or approximate location and inform the user, which can include displaying the user's location on a map or other interface.

In other cases, automatic location identification can be used for other processes, such as geolocation and geofencing applications, tracking and advertising purposes, and other location-sensitive or location-aware applications.

In many cases, Global Navigation Satellite System (GNSS) techniques can be used to determine the geographic location of a device. In many other cases, however, GNSS systems are inaccurate, such as when the GNSS signals are unavailable or unreliable because the device is indoors or otherwise in a location that interferes with or blocks these signals.

Improved and alternate techniques for identification of the location of a user device are desirable.

SUMMARY

Various disclosed embodiments include systems and methods for determining a location based on a direction sign. As described herein, a direction sign, whether outdoors or indoors, can provide enough information so that the techniques described herein are able to determine the location of an individual based on an image of the sign and image data extracted from the image. Disclosed systems and methods enable a device or user of the device to automatically determine a location without needing GNSS availability or other specific radio technology, by exploiting signs intended to direct individuals to specific points of interest.

One disclosed method includes receiving, by one or more processors, a map of a physical area. The map includes a plurality of nodes and at least some nodes of the plurality of nodes represent points of interest (POIs). Each node of the plurality of nodes is connected to at least one other node of the plurality of nodes by a link, and each link represents a travel path between connected nodes and has an associated distance value. The method includes receiving image data that indicates at least a first destination POI associated with a first physical direction and a second destination POI associated with a second physical direction. The method includes associating the first destination POI with a first node of the plurality of nodes and associating the second destination POI with a second node of the plurality of nodes. The method includes determining a location node of the plurality of the nodes by: (i) identifying a candidate node of the plurality of the nodes, (ii) identifying a first path corresponding to a smallest summed distance value from the candidate node to the first node, and identifying a second path corresponding to a smallest summed distance value from the candidate node to the second node, where the first path is defined by one or more links including a link in a first link direction from the candidate node, and the second path is defined by one or more links including a link in a second link direction from the candidate node, and (iii) deeming the candidate node to be the location node based at least on the first link direction corresponding to the first physical direction and the second link direction corresponding to the second physical direction. The method includes returning, by the one or more processors, a physical location in the physical area corresponding to the determined location node.

In various embodiments, the distance value represents a physical distance along the travel path represented by the associated link or represents a travel time along the travel path represented by the associated link. Some embodiments include associating the location node with the image data. In various embodiments, the image data also includes a first distance value corresponding to the first destination POI, and the first distance value is substantially the same as the smallest summed distance value to the first node. In various embodiments, the smallest summed distance value to the first node represents the sum of distance values of links that form the first path.

In various embodiments, the physical area is the interior of a physical building or a plurality of connected buildings, while in other embodiments the physical area is a geographic region. Various embodiments include determining that the first physical direction is different from the second physical direction when the first path does not intersect the second path.

In various embodiments, the first physical direction indicates a direction of a shortest travel path between the physical location and the first destination POI. In various embodiments, each link has an associated link direction with respect to each node to which that link is connected. In various embodiments, the second link direction is different from the first link direction.

In various embodiments, the map includes, for each node, a link direction corresponding each of the other nodes in the plurality of nodes that indicates or corresponds to a path to each of the other nodes with a shortest distance value.

In various embodiments, the image data indicates an angle between the first physical direction and the second physical direction. Various embodiments also include determining if an angle between the first link direction and the second link direction corresponds to the angle between the first physical direction and the second physical direction.

Disclosed embodiments also include an apparatus having one or more processors, at least one non-transitory computer readable medium, and program instructions stored on the at least one non-transitory computer readable medium and executable by the one or more processors to perform processes as described herein. Such an apparatus can be implemented by a single device or system or by multiple devices or systems. Disclosed embodiments also include a non-transitory computer readable media having stored thereon instructions executable by one or more processors to cause a mobile device or a server system to perform operations or processes as described herein.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the terms "controller" or processor can refer to any device, system or part thereof that controls at least one operation, whether such a device is implemented in hardware, firmware, software or some combination of at least two of the same. It should be noted that the functionality associated with any particular controller or processor may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding, reference is now made to the following description taken in conjunction with the accompanying Drawings in which.

DETAILED DESCRIPTION

Referring now to the drawings, wherein like reference numbers are used herein to designate like elements throughout, the various views and embodiments of systems and methods for estimating a device location based on direction signs and camera output (or received image data from camera images), and related techniques, are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Modern global cellular and non-cellular positioning technologies are based on collecting large global databases containing information on cellular and non-cellular signals. A large portion of this data typically originates from the users of these positioning technologies. Collection of data in this way from voluntary users of the service is referred to as crowd-sourcing.

Data from users is typically in the form of "fingerprints," which may contain a location reference and the measurements taken from the radio interfaces (e.g., cellular, Wi-Fi, Bluetooth Low Energy, and ultra-wideband interfaces, among others). The measurements may contain global and/or local identifiers of the cellular network cells observed and, possibly, data such as identifiers, signal strength, path-loss estimates, timing measurements, device addresses, or other data related to detected access points, base stations/eNodeBs, and other transceivers in the area.

This data gets uploaded to the server or cloud, where the algorithms are run to generate models of wireless communication nodes for positioning purposes based on the fingerprints received from the multitude of the users. Such models may be coverage areas, node positions, radio propagation models, Rx fields, etc. In the end, these models may be transferred back to the user terminals for use in position determination.

Note that even when the end user terminal has GNSS capability and availability, the end user can still benefit from using cellular/non-cellular positioning technologies in terms of time-to-first-fix and power consumption. Also, not all applications require highly accurate GNSS-based position (e.g., for local weather application it suffices to use cell-based location estimate). Also, cellular/non-cellular positioning technologies work indoors and in urban canyons, which are generally challenging environments for GNSS-based technologies.

A major challenge in crowd-sourcing is obtaining the location references for the fingerprints. While the location references can be easily obtained in some contexts, e.g., from GNSS, obtaining reliable location references indoors is still a big challenge. Because GNSS does not work indoors in general, sensor-based solutions quickly diverge in the absence of GNSS fixes (lack of absolute location reference). Therefore, any additional source of location information indoors is of great use for crowd-sourcing-based positioning systems. Non-GNSS location information is usable also outdoors because GNSS usage is power-hungry and not available or is unreliable in urban "canyons."

In indoor spaces or other spaces where GNSS is ineffective, positioning of a mobile device or georeferencing of crowd-sourced fingerprints is challenging. Therefore, hybrid positioning methods can be used which combine location information from multiple sources using, e.g., Bayesian filtering and/or smoothing algorithms. Inputs to such hybrid positioning methods can include, e.g., GNSS-based positions, wireless network-based position estimates, and sensor information of, for example, inertial and pressure sensors. However, these may be inaccurate or available only occasionally or not at all. Therefore, any hints of the location can be employed in the positioning methods as "signals of opportunity."

One potential source of location information is the output of the device's camera, such as photos, videos, and real-time camera stream. One way to exploit the camera output is using visual fingerprinting. In such a process, a photo or video can be compared with an existing database of georeferenced images/videos. If the photo or video being analyzed is similar enough to a database item, such as based on geometric feature extraction and a classification algorithm, the device location is probably close to the georeference corresponding to the database item.

In other cases, a camera image may include dedicated markers with known locations that can be extracted from the photos or videos, such as a dedicated Quick Response (QR) code in a building. In still other cases, a video can be used to do "dead reckoning" using visual odometry technique, by estimating such factors as how much the device has moved, at what velocity, and how the device's heading and orientation have changed. Further, some processes can use feature matching by extracting features from a photo or video and matching them to a geographical map. For example, a brand name or logo extracted from a photo or a video with a rough georeferencing can be linked to point of interest (e.g., a shop) with the same name. The location of the point of interest is known by the map, so the device can be georeferenced quite accurately.

Disclosed embodiments take advantage of other data that can be extracted or derived from photos or videos, by detecting directional information to different destinations in the image, and using that image data in combination with a "map" of the relevant area to determine the location of the device.

Various disclosed embodiments can determine the position of the device in a physical location based on direction signs extracted from a photo, video, or real-time camera stream, for example using a map describing points-of-interest (POI) names and locations and the allowed and/or prohibited routes between the POIs. Such direction signs are common both for indoor locations, e.g., in hospitals, shopping malls, administrative buildings, office buildings, and schools, and outdoor locations, such as to direct pedestrians, to direct drivers to specific destinations, or as common street signs.

According to various embodiments, based on direction information extracted from the camera output, a system can determine which POI pairs are in the same physical direction and which POI pairs are in different physical directions. Then, the system can identify to find areas or points in the map that match with these findings. Various embodiments assume that two POIs are in different directions if and only if the shortest paths to these POIs do not intersect.

In various embodiments, in most cases, the location of the device can be determined with reasonable accuracy when the direction sign contains the names of at least two POIs that are in at least two different directions. The location estimate can be unambiguous (such as a single specific point or single, small, unified area) in a variety of cases, such as when there are at least three POI names in at least three different directions.

However, the techniques disclosed herein are also valuable where it is not possible to identify a single, unambiguous location, but the process rather identifies multiple possible device locations on the map. If a process as disclosed herein returns multiple possible locations or areas, the returned locations can be used as measurements in a Particle filter or in a Gaussian Mixture filter (or a Particle Smoother or a Gaussian Mixture smoother), for example. If the disclosed methods return an unambiguous result (exactly one location or one area), the returned location can also be used as a measurement in a Kalman filter (or a Kalman smoother).

Figure 1A:
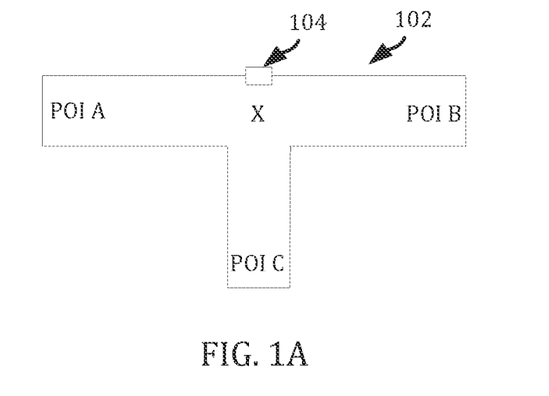
FIGS. 1A-1C illustrate an example of identifying a location based on an image of a direction sign in accordance with disclosed embodiments.
Figure 1B:
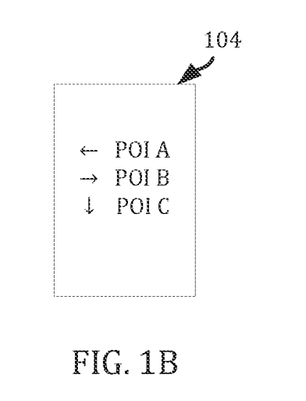
Figure 1C:
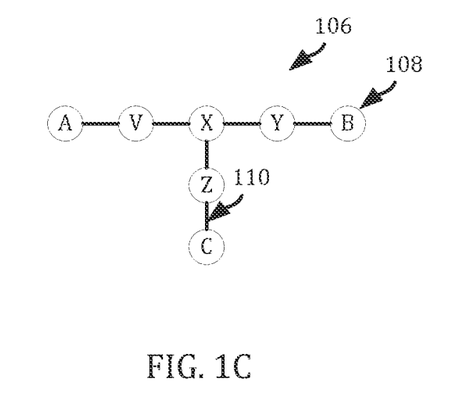

FIGS. 1A-1C illustrate a first example of identifying a location based on an image of a direction sign in accordance with disclosed embodiments. FIG. 1A illustrates an example of physical layout 102 that includes a direction sign 104. FIG. 1B illustrates direction sign 104 and its contents for this example.

The example physical layout 102 of FIG. 1A can represent, for example, the corridors inside a building, or can represent, for example, the intersection of two streets. In the physical layout 102, there are three points of interest—POI A, POI B, and POI C—which can represent any place of interest that might be a destination to a person moving within the physical layout 102, connected by travel paths in the physical layout 102.

In various embodiments, a physical layout can include any physical layout with travel paths and POIs. A physical layout can be a floor plan with the POI locations and POI names indicated. The physical layout can include a road network plan (roadmap) with the geographical locations identified, which can be treated as POIs. A "travel path" can include, in indoor physical locations, corridors, doorways, and other paths that are accessible to the public or are accessible to authorized users, etc. Similarly, a "travel path" can include, in outdoor physical locations, roads, sidewalks, paths, and other ways that are accessible by walking and/or driving.

In various embodiments, either the local device or a server system can create a map (or graph) corresponding to the physical layout. This process can be performed at any time prior to performing the location-identification processes described below. While the terms "map" and "graph" are used herein, and specific illustrative examples are shown using an actual node-and-link representation as described below, these are not required for the internal representation of the map. As described herein, a map includes a plurality of nodes, representing discrete locations in the physical layout, connected by links, representing travel paths between locations in the physical layout. At least some of the nodes represent POIs. This map can be represented using any suitable data structure, including graphs, tables, linked lists, and others, that represents the physical layout using specific node locations, links between nodes, relative directions for links with respect to nodes, "distance value" weightings for each link, and/or other features as described herein.

To produce such a map, the system can analyze a physical layout, such as may be represented by a floorplan, roadmap, or other type of map that reflects the physical layout and the possible travel paths within the layout. The system then forms a graph as described herein, where nodes represent specific locations in the physical layout, and each node may or may not be located at a POI. There should be a node close to each POI that might appear on a sign as described herein, and each POI is associated with the closest node. The nodes indicate link ends or link connection points, so that each link connects two nodes, but some nodes may be only connected to a single link. The links represent the allowed travel paths, of whatever type appropriate for the physical layout, and corresponding distance values.

In an outdoor case, such a graph is may be readily available or easily created because the road networks are typically represented as a graph. Similarly, in an indoor case, a routing graph may be available. If such a routing graph is not readily available but a wall-open space representation of the floor plan is available, the topological skeleton of the wall representation, sometimes also called the Voronoi diagram, can be used as the graph representation. The skeleton of a monochrome digital image can be created automatically by the system.

FIG. 1C represents a map (or graph) 106 that corresponds to the physical layout 102. Map 106 includes a plurality of nodes 108, representing discrete locations in the physical layout 102, connected by links 110, representing travel paths between locations in the physical layout 102. As illustrated herein, a link without an arrow represents a travel path that can be traveled by a user (walking, driving, or otherwise) in either direction, and arrow links represent one-way travel paths (e.g., one-way streets or paths that include doorways through which a person can pass only in one direction).

Figure 2A:
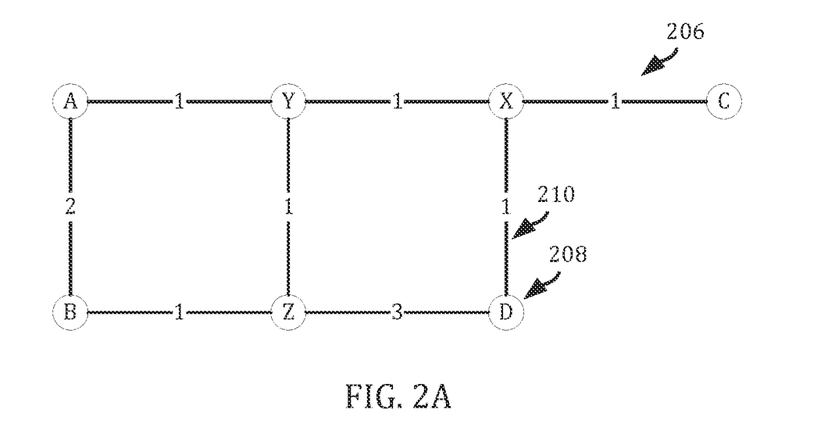
FIGS. 2A-2D illustrate other examples of identifying a location based on an image of a direction sign in accordance with disclosed embodiments.

For clarity of description herein, nodes in FIGS. 1C and 2A labeled A, B, C, or D represent POIs to which a direction sign may provide directions or where a user/device may be located, while nodes labeled V, X, Y, or Z represent non-POI locations where a user/device may be located or where a direction sign may be located. That is, in general, processes disclosed herein can identify a "location node" on the map that is the node nearest to the direction sign that is being analyzed. The location node therefore can represent the approximate physical location of the user/device at the time the image was captured, and can be any one of the nodes on the map (where a unique location node is identified), whether a POI node or a non-POI node. Where multiple nodes are identified as potential location nodes, those multiple location nodes indicate alternatives of the most likely approximate physical location of the user/device at the time the image was captured.

The labels used here are for clarity of illustration and a non-limiting, and a given map may have any number of discrete nodes and connecting links that represent a physical layout. A direction sign 104 can include, for example, simple POI identifiers and arrows, distances, street names, or other information that is usable by pedestrians or drivers to be directed toward the destination POIs. Non-POI locations may simply be identified by otherwise-arbitrary node labels, while POI nodes may be associated with proper location names of the corresponding POI. For example, node POI A may be associated with the label "EXIT," node POI B may be associated with the label "GARAGE," etc.

As disclosed herein, a device can capture an image of the direction sign 104. From that image, image data can be extracted, either by the device itself or by another system to which the image is transmitted. The image data indicates one or more destination POIs (in this case POI A, POI B, and POI C) each associated with a physical direction (as indicated by the arrows in direction sign 104). A destination POI extracted from an image may be referred to herein as an "extracted POI." Note that the arrows and physical directions may have an unknown orientation—that is, the image has captured the direction sign 104, but the orientation or direction the camera was facing is not necessarily known and so the absolute directions indicated by the arrows may also be unknown. The extracted POIs will typically be or include the proper location name of that POI, as described above, and can then be associated with the corresponding POI node on the map. Together, the data extracted or recognized from the image, including POI names, directions, distances, angles, or other information is referred to herein as the "image data."

The process of the device capturing the image of the direction sign can occur in any number of ways in various embodiments. The image itself can be a photographic image or video image. In one example, a device user may wish to determine her location in a building or geographic area and so deliberately captures an image of a direction sign as described herein so that disclosed processes can reveal the user's physical location. In other cases, however, the image including the direction sign may be captured during use of the device without the specific intent to capture the direction sign. For example, the device may capture an image of a direction sign when the user is taking a photo or video of the general area that includes the direction sign, when the user is taking a self-photograph that captures the image of the direction sign, when the user is using the device to capture images of her surroundings to display an "augmented reality" view of her surroundings, or otherwise. Disclosed techniques can therefore be used both deliberately, in a process to specifically determine the device location, and incidentally, where the system takes advantage of any image captured by the device that includes a direction sign and automatically determines the device location at the time the image was captured.

In various embodiments, for example, either the device or a server can use pattern recognition processes to extract the POI names and direction indicators (typically arrow symbols) from a photo, video or real-time video stream. Such an image may be provided by the user or that is actively taken by the positioning system from the device camera. The system can classify the extracted POI names based on the extracted direction symbols.

In the example of direction sign 104, the classes and the corresponding POI name groups are (Direction "←", {POI A}), (Direction "→", {POI B}), and (Direction "↓", {POI C}). Note that, in various embodiments, the actual absolute directions are not significant, since the system analyzes which POI pairs are in the same direction, which POI pairs are in different directions, and/or the relative angles between POI directions.

For example, assume that image data is extracted from direction sign 104, and indicates that the three POIs POI A, POI B, and POI C are in different directions as illustrated by the arrows in FIG. 1B.

The system (either the user device or an external system) can determine from the image data extracted from the image of direction sign 104, and a stored map 106 indicating the locations of the POIs A, B, and C, that the device that took the photo or video must be close to the location X. The system can also determine that the orientation of the device when the image was captured was facing whatever direction is indicated, in this example, as "up" in map 106. For example, from direction sign 104 and map 106, the system can determine that node X is the point at which POI A is in the opposite direction from POI B, and POI C is at a 90° direction from the travel paths to POIs A and B. Alternatively, the system can determine, for example, that node X is the only point at which travel paths to the three POIs are in three different directions. References to the "device location" herein refer to the location of the device when it captured an image of a direction sign.

Various embodiments assume that direction signs such as those discussed herein indicate a travel path to the destination POI that is the shortest path to the destination POI from the current location using permissible travel paths. The "shortest path" can refer to the route that has the shortest total travel distance or can refer to the route that has the shortest total travel time, using the mode of travel appropriate for the physical location, each using permissible directions as discussed above for one-direction links. Where there are multiple equivalent "shortest paths" from the current location to the destination POI, then various embodiments assume that the directions signs indicate the direction of one of those multiple shortest-route travel paths. While the specific examples discussed below are in terms of two-dimensional physical layouts and corresponding maps, disclose techniques are also applicable to three-dimensional physical layouts and the corresponding 3D maps can take into account, when calculating shortest paths, features such as elevators, escalators, stairs, ramps, and other means by which pedestrians or vehicles can move between 3D levels.

To identify the shortest paths, the device or a remote server can traverse the map, by "looping" over all of the map nodes (or all of the map nodes that are in the area of the device's probable location considering its prior location). For each "candidate" node in the map, the device or a remote server can find the shortest travel paths to the each of the extracted POIs, for example the shortest paths to the nodes POIs A, B, C, and D. This can be performed, for example, using Dijkstra' s algorithm.

Various embodiments can also determine locations based on distances or the direction angle differences of the POIs. If the distances or direction angles to some POIs can be extracted from the direction sign into the image data, and are represented the map, the position estimate may become more precise and less often ambiguous. In such cases, the "distances" represented in the image data can be physical distances to the POIs (e.g., in feet, yards, meters, etc.) or travel times to the POIs (e.g., walking time or driving time, depending on the physical location).

Figure 2B:
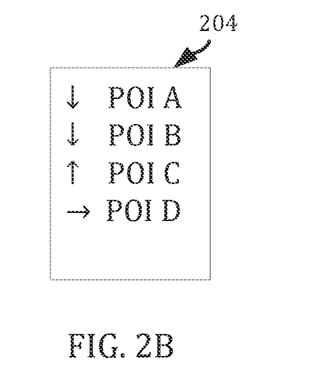

FIGS. 2A-2D illustrate other examples of identifying a location based on an image of a direction sign in accordance with disclosed embodiments. In this example, the map includes distance information for each link. FIG. 2A represents a map (or graph) 206 that corresponds to a physical layout (not shown). FIG. 2B illustrates direction sign 204 and its contents for this example. Map 206 includes a plurality of nodes 208, representing discrete locations in the physical layout, connected by links 210, representing travel paths between locations in the physical layout. Each link is "weighted" with a distance value, which can represent, for example, physical distances or travel times. For example, the link between nodes Z and D has a distance value of 3, as compared to the link between nodes X and D, with a distance value of 1.

In this illustrative example, one can see that there may be a unique "shortest path" between two nodes or there may be multiple equivalent "shortest paths" between two nodes. For example, a travel path between node Z and node D can proceed directly from Z to D in a single link with a distance value of 3. Alternately, a travel path between node Z and node D can proceed from Z to Y (distance value 1), from Y to X (distance value 1), and X to D (distance value 1), for a total summed distance value of 3. A "summed distance value" refers to the sum of the distance values of all links in a given path, and the "smallest summed distance value" represents the distance value for a shortest path between two nodes. In this case, the paths Z→D and Z→Y→X→D are both "shortest paths" between D and Z. Note that, if all links are bidirectional, that the shortest paths between two nodes will generally be the same in reverse. If there are one-way links, for example representing one-way streets or paths with one-way doors, then the shortest path A→B may be different than the shortest path B→A. Disclosed embodiments assume that a direction sign, such as direction sign 204, indicates a shortest path from the (unknown) device location to each of the indicated destination POIs.

As described above, the system can classify the extracted POI names based on the extracted direction symbols. In the example of direction sign 204, the classes and the corresponding POI name groups are (Direction "↓", {POI A, POI B}), (Direction "↑", {POI C}), and (Direction "→", {POI D}).

Possible device locations, for a given map and direction sign, are the nodes for which the shortest paths to the extracted POIs (a) intersect for the each extracted POI that is in the same direction as indicated by the direction sign, and (b) do not intersect for extracted POIs that are in different directions. Intersection means that the paths share at least one link or one node in addition to the initial node and implies that the POIs are in the same directions, and vice versa.

In the example of FIGS. 2A-2B, the device location must be at node X, because both A and B are in the same direction from X (towards Y). That is, from X, the shortest path to A is X→Y→A (summed distance value 2). The shortest path to B is X→Y→Z→B (summed distance value 3). Because the shortest paths to A and B both include X→Y, these paths intersect and are in the same shortest-path direction.

From Y, on the contrary, the shortest path to A is Y→A (summed distance value 1), and the shortest path to B is Y→Z→B (summed distance value 3). These two paths do not intersect, so A and B are in different shortest-path directions from Y.

Z is also not a probable location, since the shortest paths to POI A (Z→Y→A) and POI B (Z→B) do not intersect and so A and B are in different shortest-path directions from Z.

Direction sign-based positioning as disclosed herein more often gives an unambiguous result when the distances to the POIs can be extracted from the sign (or image data) instead of or in addition to the directions. The distances can be distances given directly in meters or in other units or, e.g., as walking times to the POIs in minutes (often available at airports).

Figure 2C:
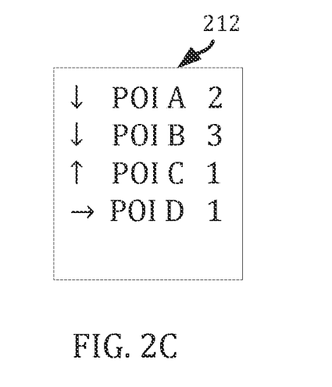

For example, FIG. 2C illustrates direction sign 212 and its contents that corresponds to direction sign 204 and map 206 and also includes distance information. As is clear from this example, finding the unambiguous device location is even more likely, since node X is the only point that satisfies the shortest-path distances. In fact, only node X can satisfy the shortest-path distance from POI C.

In the example of direction sign 212, the classes and the corresponding POI name groups can also include the distance information, such as (Direction "↓", {POI A (2), POI B (3)}), (Direction "↑", {POI C (1)}), and (Direction "→", {POI D (1)}).

Figure 2D:
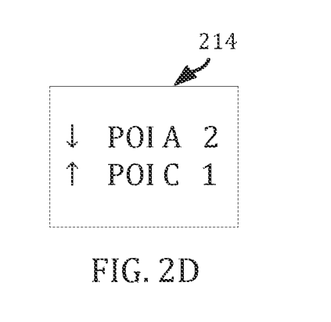

As another example, FIG. 2D illustrates direction sign 214 and its contents that corresponds to direction sign 204 and map 206 and also includes distance information. In this example, only the shortest paths from A and C are shown and are in opposite directions. As is clear from map 206, this could mean, without more, that the device location is either at node X or node Y. Since distance information is included in direction sign 210, node X is the only point that satisfies the shortest-path distances and directions, eliminating any ambiguity.

It is often the case that distances may not be precisely represented in either the map or the direction sign. Various embodiments can convert the distances extracted from the sign or image data into units used in the graph, such as meters, yards, blocks, miles, or travel time. For example, walking time can be converted to a physical distance, such as in meters or yards, by assuming, e.g., a general expected walking speed (e.g. 1.4 m/s) or a user-specific walking speed estimate based on historical sensor data captured by the system. The interpretation of the travel time information may be determined based on the context. For example, travel times at airports or indoors in general may be assumed to represent walking time, while travel times on a highway may be assumed to represent driving times. The system can then find the node for which the differences between path lengths (in terms of total summed distances) on the map and distances extracted from the image is the smallest, such as by comparing the sum of squared differences. The most probable device location is the node that has the smallest difference between the extracted distances and the mapped shortest-path distances for each destination POI.

Various embodiments can also consider the relative angles between different direction indicators on a sign instead of or in addition to other extracted information. For example, the system can extract the direction angle $\alpha_1^{sign}$ to each POI I from the sign image or the image data, and can assign relative angles for each of these. For example, the system takes the direction "up" to be the angle 0° and determines the remaining direction angles relative to the "up" direction. In the example of the sign of FIG. 2B, POIs A and B would be in direction 180°, POI C in direction 0°, and POI D in direction 90°. Note that while these illustrative examples use links and intersections at 90° angles, real-world implementations may include any other angles for link directions. Indoor implementations will more commonly include straight corridors and orthogonal intersections, while outdoor implementations more often include a wider range of angles of intersections and travel paths. Similarly, various embodiments, when creating a map from a physical layout, can either reflect curved paths as curves or can add linked nodes along the physical curve to approximate the curved path as a series of straight links. It is assumed that the directions represented both on the sign and in the map are substantially accurate, but not necessarily precisely accurate.

From this information the system can example the shortest-path directions for each node in the map, such as map 206. For each node, the system can find the direction angle $\alpha_1^{map}$ for each POI I in the map based on the initial links of the shortest path to the POI. For example, the system can assign the angle towards the positive y-direction of the map as 0° and the angle increases clockwise. For each node, the system can find the angle $\beta_{min}$ that minimizes the sum of angle differences $S_\beta = \Sigma_i$ angleDifference($\alpha_1^{sign}-\beta$, $\alpha_1^{map}$). That is, the system can find the orientation angle $\beta_{min}$ of the sign with respect to the map for each destination POI that appears on the sign. The most probable device location is the node where $S_{\beta_{min}}$ is the smallest—that is, where the actual shortest-distance directions to each of the POIs on the sign most closely matches the computed shortest-distance first-link directions in the map.

Figure 3:
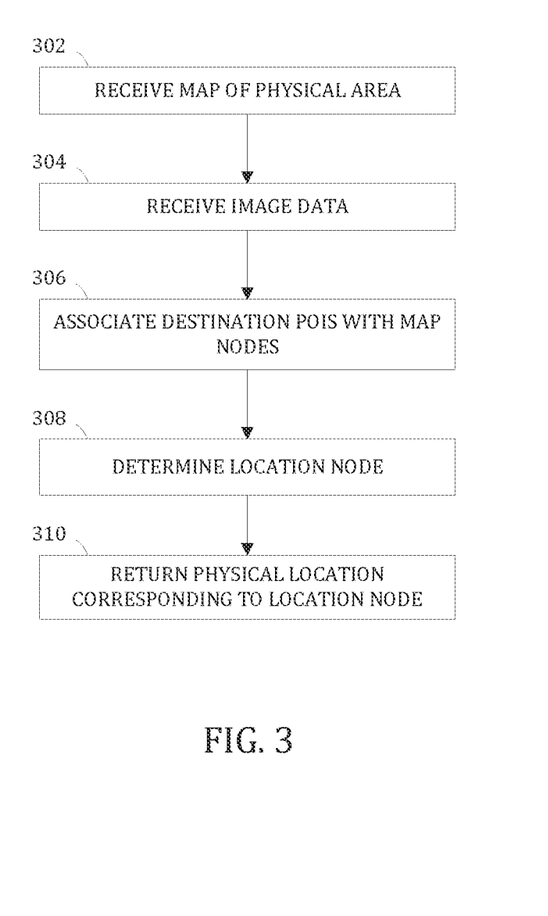
FIG. 3 illustrates an example of a process in accordance with disclosed embodiments.

FIG. 3 illustrates an example of a process in accordance with disclosed embodiments. Each of the various steps described below can be performed, in various embodiments, by either the device itself (that is, for example, the device that has captured an image of the sign from which the location is to be derived) or by a server system, such as a cloud computing system, an edge computing system, or any other computing system that is in communication with the device. The term "the system" in the process below is intended to refer to whichever device or computing system is performing that particular process step. It is understood that relevant data is communicated between the device or computing system as necessary to perform each process; for example, if, in a particular implementation, the device captures an image of a sign and the server system extracts the POI, direction, and other information (the "image data") from the image, then those of skill in the art recognize that the image is transferred by the device to the server system so that the extraction can be performed. In general, the "system" can be represented by any combination of one or more processors, in one or more physical devices or systems, that together perform each of the processes described below.

The system can receive a map of a physical area (302). The map can include a plurality of nodes, where at least some nodes of the plurality of nodes represent points of interest (POIs). Each node is connected to at least one other node by a link that represents a travel path between connected nodes and has an associated distance value. Each link can have an associated link direction with respect to each node to which that link is connected; the link direction can be considered with respect to the direction from which that link extends from each connected node, so that where a link may, for example, have a "link direction" of 90° with respect to one node and a link direction of 270° with respect to another node. The physical area can be, for example, the interior of a physical building or a plurality of connected buildings or can be a geographic region. Note that, in a typical implementation, the user, device, or remote system is generally already aware of a rough estimate of the location, such as the building where the device is located or the general geographic area of the outdoor location, so that the relevant map can be more efficiently retrieved. This could be, e.g., a recent GNSS location outdoors or coarse Wi-Fi-/cellular-based location indoors.

In some cases, the map can include some or all of the nodes, a link direction corresponding each of the other nodes in the plurality of nodes that indicates a path to each of the other nodes with a shortest summed distance value.

"Receiving," as used herein, can include loading from storage, receiving from another device or process, receiving via an interaction with a user, or otherwise. For example, in 302, the system receiving the map can include loading the map from storage, receiving the map over a network from a device, generating a map from a physical layout as described above, etc. Similarly, "returning" can include sending to another device or process as well as displaying a result to a user or storing the result in a storage.

The system can receive image data that indicates at least a first destination POI associated with a first physical direction and a second destination POI associated with a second physical direction (304). This process can include capturing or receiving an image and extracting the image data from the image as described herein, can include receiving the image data over a network from a device, and otherwise. The image data can be, as described herein, data that reflects the content of a direction sign in the physical area.

In some cases, the image data can indicate an angle between the first physical direction and the second physical direction.

The system can associate the first destination POI with a first node of the plurality of nodes and associate the second destination POI with a second node of the plurality of nodes (306). As described above, the POIs may be represented as proper names or other locations in a physical layout, and the system can here, if necessary, associate each POI with the corresponding node on the map.

The system can determine a location node of the plurality of the nodes (308). This can be performed, in various embodiments by identifying a candidate node of the plurality of the nodes, then identifying a first path corresponding to a smallest summed distance value from the candidate node to the first node and identifying a second path corresponding to a smallest summed distance value from the candidate node to the second node. The first path is defined by one or more links including a link in a first link direction from the candidate node, and the second path is defined by one or more links including a link in a second link direction from the candidate node. That is, for each node processed by the system as a "candidate" to be the true location node, the system identifies the shortest paths to the first node/POI (which has a link extending from the candidate node in a first direction, and to the second node/POI (which has a link extending from the candidate node in a second direction). The system can then deem the candidate node to be the location node based at least on the first link direction corresponding to the first physical direction and the second link direction corresponding to the second physical direction. Stated differently, as the system checks the shortest-path directions from each of the candidate nodes, it can deem that a specific candidate node is the location node when the shortest-path directions from that candidate node to the POIs match the physical directions indicated by the image data.

In cases where a single node cannot be unambiguously determined to be the sole possible location node, the system can determine multiple location nodes that each represent a possible device location. In such cases, the system may still be able to determine a single location node using other information that may be available to it. For example, many buildings have different color schemes associated with different wings, floors, or areas, and the system may be able to extract color information from the image data to determine a single location node from the multiple location nodes. In other cases, the image data may include other information such as images of other signs or physical features, such as store names, office names, or others, that can be used to determine a single location node from the multiple location nodes. In still other cases, the system may be able to determine the device's approximate travel time, distance, or direction since its last known location, based on sensor data, and use this information to determine a single location node from the multiple location nodes. Other techniques can be used.

Note that, in specific embodiments, the first link direction corresponds to the first physical direction and the second link direction corresponds to the second physical direction when the first link direction and the second link direction have an angular difference from each other that substantially matches the angular difference between the first and second physical directions. Since the absolute orientation of the image data or the sign may not be known, the relative directions between the first/second link directions and the first/second physical directions, such as reflected in their angular difference, can reflect the required correspondence. In various cases, the first physical direction indicates a direction of a shortest travel path between the physical location and the first destination POI, and, similarly, the second physical direction indicates a direction of a shortest travel path between the physical location and the second destination POI. The system can determine that the first physical direction is different from the second physical direction when the first path does not intersect the second path. In some cases, particularly where the image data itself indicates an angle between the first physical direction and the second physical direction, the system can determine if the angle between the first link direction and the second link direction corresponds to the angle between the first physical direction and the second physical direction as represented in the image data.

The summed distance value is the sum of distance values associated with each link in each of the paths, where the distance value of each link represents a physical distance along the travel path represented by the associated link or represents a travel time along the travel path represented by the associated link. That is, for example, the smallest summed distance value to the first node represents the sum of distance values of links that form the first path. In some cases, the image data itself includes a first distance value corresponding to the first destination POI, and the first distance value is substantially the same as the smallest summed distance value to the first node.

The system can return a physical location in the physical area corresponding to the location node (310). The system can also associate the location node with the image data so that the location of the image/sign can be stored for future use. As described above, returning the physical location can include a number of alternatives, including sending to another device or process as well as displaying a result to a user or storing the result in a storage. As a specific example, returning the physical location can include displaying the physical location to the user, on a map or otherwise, or transmitting the physical location to another system. Returning the physical location can include sending the physical location to a process on the device or a server that tracks the device's location for any number of purposes, including for transmitting the device's location to another device, system, or user. Returning the physical location can include sending the physical location to a process on the device or server that performs radio mapping or fingerprinting processes as described below or otherwise performs crowd-sourcing functions as described herein. Returning the physical location can include storing the physical location for later analysis, such as for performing an audit of where the device has been transported or used. Returning the physical location can include tagging or geo-referencing images captured by the device, such as the image of the direction sign and other images taken at or near the same time or location. Returning the physical location can include tagging or geo-referencing physical maps based on known direction sign locations and the determined physical location. Returning the physical location can include tagging or geo-referencing specific elements of images captured by the device such as store signs or other non-transient elements of specific physical locations. Returning the physical location can include tagging or geo-referencing specific transient elements of images captured by the device, such as for performing facial-recognition processes on people in a certain place at a certain time, tracking license-plate numbers, and other such processes. Returning the physical location can include storing, transmitting, or displaying the physical location for any purpose in which knowing the device location would be advantageous.

Figure 4:
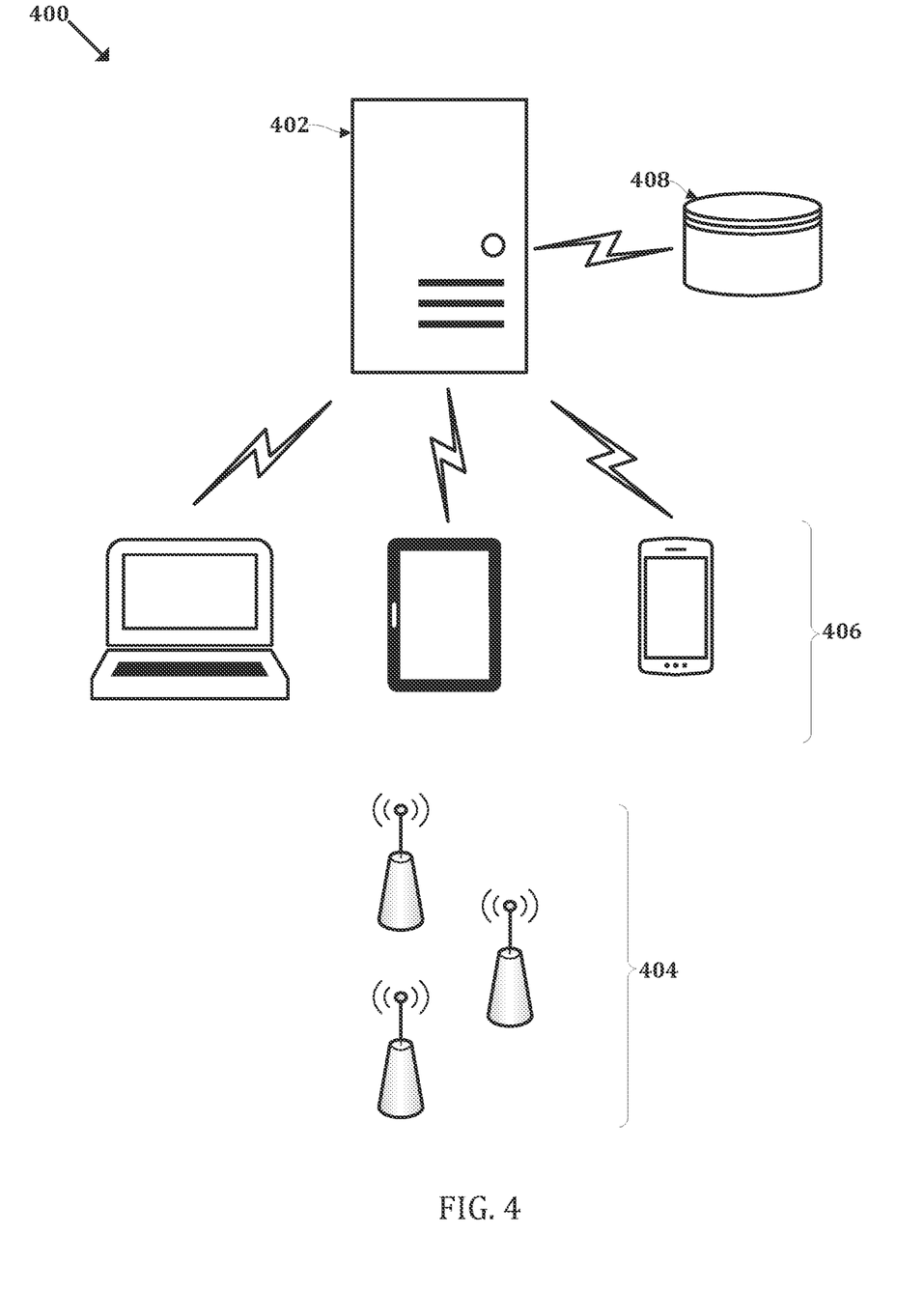
FIG. 4 illustrates an arrangement that may implement processes as described herein, in accordance with disclosed embodiments.

FIG. 4 illustrates an arrangement 400 that may implement processes as described herein, in accordance with example implementations. Arrangement 400 could include a server system 402, radio devices 404 (could also be referred to as radio nodes or the like), one or more mobile devices such as mobile devices 406, and a database 408. The server system 402, radio devices 404, mobile device(s) 406, and/or database 408 may be configured to communicate with one another via one or more communication links (e.g., via a cellular and/or a non-cellular communication network). The server system 402 and the mobile device 406 can individually or together perform the processes described herein, and the one or more processors that perform various functions can include a processor(s) of server system 402, mobile device 406, or both.

As an initial matter, a mobile device could be any electronic device that is movable from one position to another.

For example, the mobile device(s) 406 could be or otherwise include cellular phone(s), personal digital assistant(s), a laptop computer(s), tablet computer(s), and/or wearable device(s), among other options. Preferably, the mobile device 406 includes a camera that can obtain an image of a direction sign as described herein, but in other cases the image or image data may be obtained from some other device or source.

Further, radio devices 404 may include any type of device that is configured to emit (and optionally receive) radio signals. For example, the radio devices 404 could include wireless WLAN access point(s), such as a WLAN access point that supports or is otherwise configured according to the IEEE 802.41 standard (e.g., a Wi-Fi access point). Additionally or alternatively, the radio devices 404 could include Bluetooth beacon(s) and/or cellular network node(s) (e.g. Global System for Mobile Communications (GSM), Universal Mobile Telecommunications System (UMTS), and/or Long Term Evolution (LTE) base station(s)), among other options.

Furthermore, server system 402 could take various forms without departing from the scope of the present disclosure. By way of example, server system 402 could include a single server or a plurality of servers (e.g., forming a server cloud). Moreover, server system 402 could be embodied as a positioning server of a positioning system, such as of a non-GNSS based radio positioning system for indoor and/or outdoor positioning, for instance. Server system 402 can be implemented as any system or systems that are remote from the mobile device 406 and perform one or more of the processes described herein In practice, a non-GNSS based radio positioning system could include or otherwise rely on radio devices (e.g., radio devices 404) to support the positioning solution described herein. Such radio devices may include dedicated radio devices (e.g., Bluetooth beacons) that are installed in the environment for which the positioning solution is provided. Additionally or alternatively, the non-GNSS based radio positioning system could make use of existing radio devices, such as WLAN access points and/or cellular network nodes. In any case, the radio devices could be deployed in a particular area, such as an indoor area (e.g., inside of a venue or other building).

Given this arrangement 400, the server system 402 could generate and/or update a radio map for an area, which may in turn enable position estimations for mobile device(s) in the area. Namely, the radio map could enable an entity (e.g., a server system or a mobile device) to determine characteristics of radio signals (e.g., transmitted by radio devices) that are expected to be observable respectively at different locations in the area. Accordingly, the term radio map may refer to any collection of data that provides location-linked information on a radio environment.

To help facilitate generation or updating of a radio map, server system 402 could collect "fingerprint(s)" from mobile device(s) as the locations of the mobile devices are determined from direction signs as disclosed herein.

A fingerprint collected from a given mobile device may contain or otherwise represent a position estimate and measurement(s) by the mobile device. The position estimate may be, for example, based on GNSS data, based on sensor data, based on previously collected radio measurements, and/or may be manually inputted (e.g., via a user interface), among other options. And the measurements may include, for example, radio signal parameter(s) of observed radio signals measured by a mobile device and/or identifiers of radio device(s) that emitted the observable radio signals, among others. The measurements may alternatively or additionally include other measurements such as measurements on the local magnetic field. In more specific examples, collected fingerprint(s) may respectively contain any feasible combination of the following types of measurements: global and/or local identifier(s) of cellular network node(s), Wi-Fi access point identifier(s), beacon identifier(s), signal strength measurement(s) (e.g., Received Signal Strength (RSS)), pathloss estimate(s), timing measurement(s) (timing advance or round-trip time), speed data, reference position measurement technology, collection device information, battery level data, and/or environment sensor data etc. Other examples are also possible.

Furthermore, because the above-described collection of fingerprint(s) is beneficial, such collection of fingerprint(s) could be part of a crowdsourcing process that occurs continuously or at least from time-to-time. For example, mobile devices of a large number of consumers could continuously transmit fingerprint(s) to the positioning server (e.g., server system 402) collecting the fingerprint(s) as physical locations are identified. Consumers may consent to participation in such a collection process, if their device is equipped with necessary functionality to enable the fingerprint generation and/or collection at issue as a background process, naturally with the end-user consent. Additionally or alternatively, it could be possible to use volunteers to actively survey area(s) so as to enable collection of fingerprint(s) for those area(s). Other examples are also possible.

Given that collection of fingerprint(s) may allow for understanding of how radio signals behave and travel in an area (e.g., a building), the server system 402 could use the collected fingerprint(s) in various ways to generate or update a radio map for the area.

By way of example (and without limitation), the server system 402 could define a grid to cover a site such that each grid point corresponds to a geographical location at the site. If the site (e.g., a building) comprises several floors, a separate grid may be defined for each floor, or a single three-dimensional grid may be defined with one dimension for the different floors.

Given this, if the server system 402 collects a fingerprint from a mobile device (e.g., a report that includes RSS value(s), associated radio device identifier(s), and/or other information as discussed), the server system 402 could map (i) RSS value(s) and/or associated radio device identifier(s) included in that fingerprint to (ii) the grid point corresponding to a geographical location that is closest to the position estimate indicated in that fingerprint. The server system 402 could perform such a process respectively for some or all fingerprint(s) collected from mobile device(s) in the site, so as to generate a grid-based radio map for the site.

In this example, if there are several RSS values for the same radio device that would be mapped to the same grid point, the server system 402 could determine an average value (e.g., arithmetic mean or median value) of those RSS values and associate the average value with the grid point at issue. On the other hand, for grid points to which no RSS values could be mapped due to missing fingerprint(s) from the corresponding areas at the site, the server system 402 could generate RSS values by interpolating surrounding RSS values if possible, and by extrapolating neighboring RSS values otherwise. In this way, the server system 402 could generate the radio map to identify radio devices and/or RSS values expected to be observed respectively at each of a plurality of locations throughout the site. Other (e.g., non-grid based) radio maps are also possible.

In some implementations, the radio map could include, be combined with, or otherwise correspond to another map or layout image representing features of an indoor and/or outdoor area at various locations in the area (e.g., an open area map for a pedestrian walkable area as further described herein). In the context of an indoor area, for instance, such features may include rooms, hallways, entryways (e.g., doors), vertical connectors (e.g., elevators, escalators, and/or stairs), and/or items situated in the indoor area (e.g., furniture), among numerous other possibilities. Given this, the radio map could indicate characteristics of the radio environment respectively at or nearby certain features in the area. Moreover, a mobile device could be configured to display such a radio map, to enable automatic or manual assessment of the radio environment in the area. Such an assessment could help determine whether sufficient extent of fingerprint(s) has been collected in a certain location (e.g., near a certain feature), and may provide other advantages as well.

Once a radio map is generated or updated, the server system 402 could store the radio map in a database 408 along with the image data, maps, nodes, links, paths, and other data described herein, so that the server system 402 could refer the radio map or a portion thereof on an as-needed basis and/or so that the server system 402 provide the radio map or portion thereof (e.g., to a mobile device) on an as-needed basis for positioning purposes. Generally, the stored radio map could be associated with an indoor or other space (e.g., a particular building) for which the radio map provides coverage. And the server system 402 and/or a mobile device could select a radio map to be used for positioning purposes that is associated with an indoor (or other) space at which or next to which the mobile device is located. In practice, the server system 402 and/or a mobile device could determine an indoor space at which or next to which the mobile device is located based on GNSS measurement(s) by the mobile device and/or an identifier of an access point to which the mobile device is connected, among other options.

In one case, the server system 402 could use the radio map to estimate a position of a mobile device, such as in response to a request by the mobile device to do so. In particular, the server system 402 could receive, from the mobile device, a measurement report indicating identifiers of radio device(s) and/or RSS values that are observable by the mobile device at the current position of the mobile device, and possibly other radio characteristics observable by the mobile device. In some scenarios, the measurement report could optionally also include other information that might aid in determining a position estimate, such as e.g. barometric/altitude information that may assist in determining a floor level as part of the position estimate. Nevertheless, the server system 402 can compare information in the measurement report to the radio map, to determine a position estimate. For example, the server system 402 could determine that radio device identifier(s) and RSS value(s) in the measurement report substantially match radio device identifier(s) and RSS value(s) associated with a particular grid point corresponding to a particular geographical location at the site. In turn, the server system 402 could provide, to the mobile device, a position estimate indicative of the particular geographical location at the site.

In another case, the mobile device could use the radio map (or a portion thereof) to estimate its position. To facilitate this, the mobile device could obtain, from the server system 402, at least a portion of the radio map, and could at least temporarily store the radio map locally. Once the mobile device has the radio map locally stored thereon, the mobile device could use the techniques described above in association with the server system 402 so as to estimate its position (e.g., comparing information in a measurement report to the radio map). In this way, the mobile device could engage in "offline" positioning estimations.

Advantageously, the mobile device could engage in "offline" positioning estimations at times when connectivity between the mobile device and the server system 402 is unavailable, at times when it is desired to reduce a load on the server system 402 (e.g., reduce the extent of processing by the server system 402), at times when the mobile device seeks to obtain a position estimate relatively quickly (e.g., a very short time-to-first-fix), and/or in other situations. The direction-sign-based location techniques described herein can be particularly useful for offline positioning estimates when performed by the mobile device.

In either case, a position estimate or approximate location obtained using the above-described positioning solutions could be used in various ways. For example, the mobile device could display (e.g., via a display device) an indoor navigation application including, e.g., an open area map of an indoor area and visually indicating a position of the mobile device in the indoor area in accordance with the position estimate obtained as described. Other examples are also possible.

EXAMPLE HARDWARE AND SOFTWARE

The processes described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
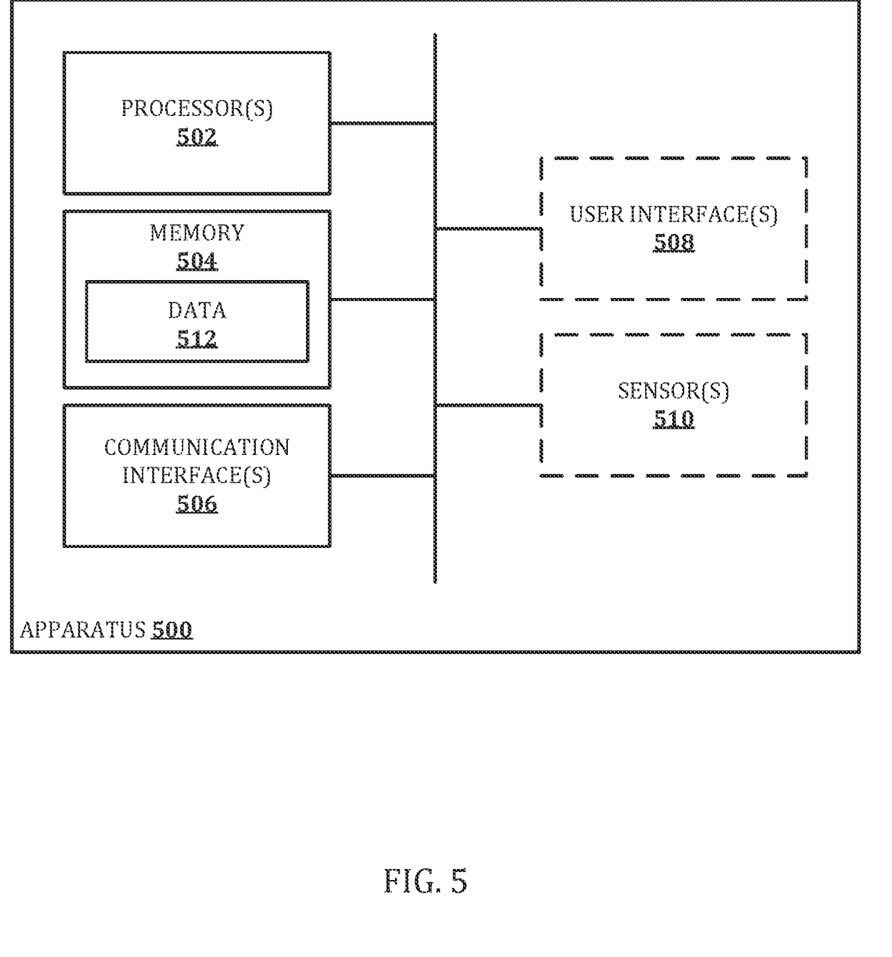
FIG. 5 is a schematic block diagram of an apparatus according to an example embodiment.

FIG. 5 is a schematic block diagram of an apparatus 500 according to an example embodiment. The apparatus 500 could, for instance, represent a server (e.g., server system 402) or a mobile device (e.g., one of the mobile devices 406), among other options. Moreover, the apparatus 500 could take the form of or otherwise be part of a system, such as any of those described herein.

As shown, apparatus 500 could include processor(s) 502, a memory 504, communication interface(s) 506, an (optional) user interface(s) 508, and (optional) sensor(s) 510. Some or all of the components of the apparatus 500 may be connected via a bus (or other mechanism) and/or be combined into one or more modules.

Processor(s) 502 could have numerous functions, such as controlling the memory 504, communication interface(s) 506, the user interface(s) 508, and/or the sensor(s) 510 in any feasible manner currently known or developed in the future. For example, the memory 504 could include or otherwise contain computer program code (program instructions), and the processor(s) 502 may be configured to execute the program code to cause the apparatus 500 to perform and/or control operations, such as any of those described herein and/or other operations. Thus, apparatus 500 and/or processor(s) 502 could be referred to as carrying out such operations.

Moreover, processor(s) 502 (and also any other processor(s) mentioned herein) may be processor(s) of any suitable type. For example (and without limitation), processor(s) 502 may include: one or more microprocessor(s), one or more processor(s) with accompanying one or more digital signal processor(s), one or more processor(s) without accompanying digital signal processor(s), one or more special-purpose computer chips, one or more FPGA(s), one or more controller(s), one or more ASIC(s), one or more computer(s), any structure/hardware that has been programmed in such a way to perform described operation(s), and/or an application processor that runs an operating system, among other possibilities.

Furthermore, memory 504 could also take various form without departing from the scope of the present disclosure. In particular, memory 504 could be separate from processor(s) 502. Additionally or alternatively, memory 504 may be part of or otherwise integrated with one or more of the processor(s) 502. In this case, memory 504 may be fixed to the from processor(s) 502 or may be at least partially removable from the processor(s) 502. In any case, the memory 504 be or take the form of volatile and/or non-volatile memory, and could include program memory, working memory, and/or data memory, among others.

By way of example (and without limitation), memory 504 could be or otherwise include: FLASH memory (or a part thereof), any of a Read-Only Memory (ROM), PROM, EPROM and EEPROM memory (or a part thereof), a hard disc (or a part thereof), a Random Access Memory (RAM), and/ or Dynamic RAM (DRAM), among others. In some cases, memory 504 may additionally or alternatively include an operating system for processor(s) 502 and/or firmware for apparatus 500. Further, memory 504 could additionally or alternatively be used by processor(s) 502 when executing an operating system and/or computer program. Other examples are also possible.

Memory 504 could additionally or alternatively store data 512, which can include any data and data structures usable for performing processes as described herein, including without limitation program code or instructions, images, image data, maps, nodes, links, directions, and any other data described herein.

Further, communication interface(s) 506 could enable the apparatus 500 to communicate with other entities. The communication interface(s) 506 may, for instance, include a wireless interface (e.g. a cellular radio communication interface and/or a WLAN interface) and/or wire-bound interface (e.g. an IP-based interface, for instance to communicate with entities via the Internet).

Yet further, user interface(s) 508 could be any device(s) for presenting and/or receiving information. For instance, user interface(s) 508 include display device(s), audio device(s) or the like for visually and/or audibly providing information (e.g., to a user). Additionally or alternatively, user interface(s) 508 could include input device(s) (e.g. a keyboard, keypad, touchpad, mouse, etc.) for receiving information (e.g., based on input provided by a user).

Finally, sensor(s) 510 could include any type(s) of sensor(s) currently known and/or developed in the future. For example, sensor(s) 510 could include a barometric sensor (e.g., to gather pressure information), motion sensor(s) (e.g., inertial measurement unit (IMU)), image capture device(s), position sensor(s), Global Navigation Satellite System (GNSS) receiver(s) (e.g., in the form of a Global Positioning System (GPS) receiver), and/or any (currently known and/or future-developed) sensor(s) that enable the apparatus 500 to perform radio measurements (e.g., Bluetooth and/or Wi-Fi receiver(s)), among other possibilities. In specific embodiments, sensor(s) 510 includes a camera operable to capture images of direction signs as disclosed herein.

In a further aspect, the term "computer-readable medium" as used herein may refer to any medium that participates in providing information to processor(s), including instructions for execution. Such a medium may take many forms, including, but not limited to computer-readable storage medium (e.g., non-volatile media, volatile media), and/or transmission media. Non-transitory media, such as non-volatile media, may include, for example, optical or magnetic disks, such as storage device. Volatile media may include, for example, a dynamic memory. Transmission media may include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media.

Generally speaking, common forms of computer-readable media may include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read.

In some cases, the term computer-readable storage medium may be used herein to refer to any computer-readable medium except transmission media. Further, logic encoded in one or more tangible media may includes processor instructions on a computer-readable storage media and/or special purpose hardware (e.g., ASIC).

In practice, a computer-readable storage medium could have stored thereon instructions executable by processor(s) to cause an apparatus to perform operations, such as any of those described herein. Accordingly, a computer program could be stored in a computer readable storage medium in the form of instructions encoding the computer readable storage medium. The computer-readable storage medium may be intended for taking part in the operation of a device, like an internal or external memory or hard disk of a computer, or be intended for distribution of the program, like an optical disc, among other options.

Disclosed embodiments can be used for both positioning and for georeferencing crowd-sourced or other data. For example, the processes disclosed herein are useful for direct positioning, including reporting the device's immediate location estimate to the user. These processes are also useful for adding location information to data items that are archived by the user or sent to a crowd-sourcing server, for example, such as automatically tagging locations in photographs or videos, in retail or restaurant reviews, and otherwise.

Disclosed embodiments provide significant technical advantages by improving the capability of the device to determine its location based on direction signs, without requiring GNSS reception. Disclosed embodiments are infrastructure-free in the sense that no radio transmitters or other specifically-installed hardware are required and no radio maps are required, though radio maps can be generated or improved based on locations determined using disclosed techniques. No special sensors are required in the device. The proposed method does not require storing large image databases, unlike visual fingerprinting. Disclosed embodiments improve on existing devices by improving location detection using a map of the location, an optional physical layout of the location (if a map has not already been generated), and an image of a direction sign. Image processing can be performed locally on the device or remotely by a server system and can be initiated with or without user intervention whenever an image of a direction sign is detected.

It will be appreciated by those skilled in the art having the benefit of this disclosure that the disclosed techniques for estimating a device location based on direction signs and camera output or received image data have been described in terms of exemplary applications and implementations, but the disclosed techniques can be implemented in any number of different applications, devices, and systems. It should be understood that the drawings and detailed description herein are to be regarded in an illustrative rather than a restrictive manner and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle. The use of terms such as (but not limited to) "mechanism," "module," "device," "unit," "component," "element," "member," "apparatus," "machine," "system," "processor," or "controller," within a claim is understood and intended to refer to structures known to those skilled in the relevant art, as further modified or enhanced by the features of the claims themselves, and is not intended to invoke 35 U.S.C. § 112(f).

What is claimed is:

1. A method comprising:
    receiving, by one or more processors, a map of a physical area, the map including a plurality of nodes, at least some nodes of the plurality of nodes representing points of interest (POIs), wherein each node of the plurality of nodes is connected to at least one other node of the plurality of nodes by a link and wherein each link represents a travel path between connected nodes and has an associated distance value;
    receiving image data, by the one or more processors, wherein the image data indicates at least a first destination POI associated with a first physical direction and a second destination POI associated with a second physical direction;
    associating, by the one or more processors, the first destination POI with a first node of the plurality of nodes and associating the second destination POI with a second node of the plurality of nodes;
    determining, by the one or more processors, a location node of the plurality of the nodes by: (i) identifying a candidate node of the plurality of the nodes, (ii) identifying a first path corresponding to a smallest summed distance value from the candidate node to the first node, and identifying a second path corresponding to a smallest summed distance value from the candidate node to the second node, wherein the first path is defined by one or more links including a link in a first link direction from the candidate node and wherein the second path is defined by one or more links including a link in a second link direction from the candidate node, and (iii) deeming the candidate node to be the location node based at least on the first link direction corresponding to the first physical direction and the second link direction corresponding to the second physical direction when a shortest-path directions from the candidate node to the POIs match the physical directions indicated by the image data;
    returning, by the one or more processors, a physical location in the physical area corresponding to the determined location node; and
    determining a position of a device using the returned physical location and a radio map.

2. The method of claim 1, wherein the distance value being determined by one of a physical distance along the travel path represented by the associated link or a travel time along the travel path represented by the associated link.

3. The method of claim 1, further comprising associating the location node with the image data.

4. The method of claim 1, wherein the image data also includes a first distance value corresponding to the first destination POI, and the first distance value is the same as the smallest summed distance value from the first destination POI to the first node.

5. The method of claim 1, wherein the smallest summed distance value to the first node represents the sum of distance values of links that form the first path.

6. The method of claim 1, wherein the physical area is the interior of a physical building or a plurality of connected buildings, or wherein the physical area is a geographic region.

7. The method of claim 1, wherein the one or more processors determine that the first physical direction is different from the second physical direction when the first path intersects the second path away from the candidate node.

8. The method of claim 1, wherein the first physical direction indicates a direction of a shortest travel path between the physical location and the first destination POI.

9. The method of claim 1, wherein each link has an associated link direction with respect to each node to which that link is connected.

10. The method of claim 1, wherein the second link direction is different from the first link direction.

11. The method of claim 1, wherein the map includes, for each node, a link direction corresponding to each of the other nodes in the plurality of nodes that corresponds to a path to each of the other nodes with a shortest distance value.

12. An apparatus comprising:
    one or more processors;
    at least one non-transitory computer readable medium; and
    program instructions stored on the at least one non-transitory computer readable medium and executable by the one or more processors to:
    receive a map of a physical area, the map including a plurality of nodes, at least some nodes of the plurality of nodes representing points of interest (POIs), wherein each node of the plurality of nodes is connected to at least one other node of the plurality of nodes by a link and wherein each link represents a travel path between connected nodes and has an associated distance value;
    receive image data, wherein the image data indicates at least a first destination POI associated with a first physical direction and a second destination POI associated with a second physical direction;

associate the first destination POI with a first node of the plurality of nodes and associating the second destination POI with a second node of the plurality of nodes;

determine a location node of the plurality of the nodes by: (i) identifying a candidate node of the plurality of the nodes, (ii) identifying a first path corresponding to a smallest summed distance value from the candidate node to the first node, and identifying a second path corresponding to a smallest summed distance value from the candidate node to the second node, wherein the first path is defined by one or more links including a link in a first link direction from the candidate node and wherein the second path is defined by one or more links including a link in a second link direction from the candidate node, and (iii) deeming the candidate node to be the location node based at least on the first link direction corresponding to the first physical direction and the second link direction corresponding to the second physical direction when a shortest-path directions from the candidate node to the POIs match the physical directions indicated by the image data;

return a physical location in the physical area corresponding to the determined location node ; and determine a position of a device using the returned physical location and a radio map.

13. The apparatus of claim 12, wherein the distance value being determined by one of a physical distance along the travel path represented by the associated link or a travel time along the travel path represented by the associated link.

14. The apparatus of claim 12, wherein the image data also includes a first distance value corresponding to the first destination POI, and the first distance value is the same as the smallest summed distance value from the first destination POI to the first node.

15. The apparatus of claim 12, further comprising program instructions stored on the at least one non-transitory computer readable medium and executable by the one or more processors to determine that the first physical direction is different from the second physical direction when the first path intersects the second path away from the candidate node.

16. A non-transitory computer readable medium having stored thereon instructions executable by one or more processors to cause a mobile device or a server system to perform operations comprising:

receiving a map of a physical area, the map including a plurality of nodes, at least some nodes of the plurality of nodes representing points of interest (POIs), wherein each node of the plurality of nodes is connected to at least one other node of the plurality of nodes by a link and wherein each link represents a travel path between connected nodes and has an associated distance value;

receiving image data, wherein the image data indicates at least a first destination POI associated with a first physical direction and a second destination POI associated with a second physical direction;

associating the first destination POI with a first node of the plurality of nodes and associating the second destination POI with a second node of the plurality of nodes;

determining a location node of the plurality of the nodes by: (i) identifying a candidate node of the plurality of the nodes, (ii) identifying a first path corresponding to a smallest summed distance value from the candidate node to the first node, and identifying a second path corresponding to a smallest summed distance value from the candidate node to the second node, wherein the first path is defined by one or more links including a link in a first link direction from the candidate node and wherein the second path is defined by one or more links including a link in a second link direction from the candidate node, and (iii) deeming the candidate node to be the location node based at least on the first link direction corresponding to the first physical direction and the second link direction corresponding to the second physical direction when a shortest-path directions from the candidate node to the POIs match the physical directions indicated by the image data;

returning a physical location in the physical area corresponding to the determined location node; and determining a position of a device using the returned physical location and a radio map.

17. The non-transitory computer readable medium of claim 16, wherein the distance value being determined by one of a physical distance along the travel path represented by the associated link or a travel time along the travel path represented by the associated link.

18. The non-transitory computer readable medium of claim 16, wherein the image data also includes a first distance value corresponding to the first destination POI, and the first distance value is the same as the smallest summed distance value from the first destination POI to the first node.

19. The non-transitory computer readable medium of claim 16, wherein the operations further comprise determining that the first physical direction is different from the second physical direction when the first path intersects the second path away from the candidate node.

* * * * *